Patented July 28, 1953

2,647,092

UNITED STATES PATENT OFFICE 2,647,092

STYRENE MODIFIED ALKYDS AND PROCESS OF PRODUCING THE SAME

Charles J. Meeske, Ferndale, and Deno Laganis, Detroit, Mich., assignors to Reichhold Chemicals, Inc., Detroit, Mich.

No Drawing. Application August 5, 1948, Serial No. 42,738

4 Claims. (Cl. 260—22)

The invention relates to the production of improved copolymerization products of styrene and oil or fatty acid modified alkyd resins, and to the resulting product.

A minor proportion of the organic acid employed in the production of the alkyd resin may be of an unsaturated character, such as maleic, fumaric, itaconic and/or sorbic, in addition to which an aromatic polybasic carboxylic acid such as phthalic acid is preferably employed in the usual proportion. Especially desirable results are obtained by the combined use of maleic and phthalic acids or their anhydrides in preparing the alkyds. In place of the oils themselves their respective acids may be employed for producing the modified alkyds. Completely saturated oils or fatty acids may be employed in modifying the alkyds where a mixture of unsaturated acids such as maleic, and aromatic polybasic acids such as phthalic, are included in the alkyd. The linkage between the styrene and the oil modified alkyd is preferably effected in the presence of a solvent which includes a high percentage of aromatics, and is aided by the use of a catalyst, preferably a peroxide catalyst.

We have found that various mixtures of oils or oil acids may be used as modifying agents for the alkyds with good results, such as a mixture of soya and tung oil acids, a mixture of tung oil, oiticica and/or tall oil acids, the acids of dehydrated castor oil, a mixture of linseed oil, tung oil and/or oiticica oil acids, or a mixture of soya and/or dehydrated castor oil acids.

With these mixtures, or any of them, may be employed a minor percentage of unsaturated acid such as maleic, fumaric, itaconic and/or sorbic, in addition to the regular amount of phthalic or other saturated polybasic carboxylic acid employed in the production of the alkyd resin.

It has been proposed to employ styrene modified oils and varnishes for use in surface coatings. Heretofore, however, no such product has been described which is adapted for use in a high bake white enamel such as is required for stoves, refrigerators, kitchen cabinets and other furniture requiring high gloss, light, color and good color stability, nor do the products previously described have the extremely good durability of the products which we have developed.

In accordance with our invention an oil or fatty acid modified resin containing a suitable linking agent for the styrene monomer is first produced, which modified alkyd resin is then dissolved in an inert solvent of high aromatic character which does not enter into the reaction, after which the monomeric styrene is added to the alkyd resin solution and the mixture heated under reflux conditions, preferably with the aid of a polymerization catalyst, until polymerization is effected. The alkyd resin is preferably formed by reacting glycerine or glycerine and ethylene glycol, with phthalic acid or anhydride modified by the use of a minor percentage of an unsaturated polybasic or monobasic carboxylic acid or anhydride having a conjugated structure, such as maleic, fumaric, itaconic and/or sorbic. The alkyd so formed is modified by the use of plasticizers comprising non-drying, semi-drying or drying oils or fatty acids or mixture of such oils and/or fatty acids.

The preferred equipment for use in the preparation of this product includes a reaction vessel which will not inhibit polymerization of the styrene monomer. It may be stainless steel, glass, glass lined, or plain iron, but preferably not copper. It may be equipped with a stirring device and have an inlet for inert gas to keep air out of the vessel. The use of a reflux condenser is desirable in the polymerization step and the use of a vapor outlet without reflux is desirable for the first stage or alkyd preparation. Some means should be provided to heat the vessel, and due to the presence of volatile and combustible materials it is not advisable to heat it with an open or direct flame. A manhole should be provided to permit loading materials into the vessel.

PROCEDURE FOR PREPARING A STYRENE AND OIL MODIFIED ALKYD

The first step is to prepare a mixture of mono-, di- and tri-glycerides of the oil or combination of oils by heating the oil or combination of oils to 230° to 240° with an inert gas flowing into the kettle to prevent darkening, and with agitation. Add one part of litharge catalyst per 1000 parts of oil on the upheat at around 180°. Add three-fourths of the glycerine to be used in the batch at 230° C. or 240° C. slowly so as not to cool the batch too much and hold 230° to 240° C. until a sample of the mixture of oil and glycerine is soluble in three to four times its volume of ethyl or methyl alcohol when cold.

At this stage there is present in the kettle a mixture of mono, di- and tri-glycerides and some small amount of free glycerine. To this mixture add the remainder (one-fourth of the total) of the glycerine and all of the polybasic acids or anhydrides.

Continue heating at 200° C. with agitation and inert gas passing through the batch until the solution of the resin in xylol has the desired viscosity or acid number.

Fatty acids may be used in place of their corresponding oils, and in such case the mixture of fatty acids, glycerine and polybasic acids are put into the cooking vessel together and esterified.

A great many different alkyds may be satisfactorily modified with styrene if they have the following important characteristics:

(1) The alkyd resin may be linked to the styrene through the action of a small percentage of unsaturated dibasic or mono basic acid such as maleic, fumaric, itaconic or sorbic acids.

(2) If the linking agent is present the oil percentage may be varied from 30% to 80% or more oil, or the alkyd further modified with rosin, phenolic or other resins and still be satisfactorily modified with styrene.

(3) The oil modified glyceryl phthalate with or without other modifiers should be dissolved in a solvent of high aromatic character as xylol, toluol, high solvency naphtha and etc.

The oil modified alkyd solution is then heated to reflux after an amount of xylene or other solvent is added and the styrene is added. A catalyst, preferably of the peroxide type, is then added. The following variables should be controlled to give the best results:

(1) The solvent should be limited to aromatics or at least a very high percentage of aromatics. Some aliphatic may be used but large quantities are not advisable as the solvent should have a high solvent power in order to give a clear solution to the styrene polymer which is formed.

(2) The amount of solvent present is very important as it controls to an important degree the polymer chain length. The most desired qualities in the styrene modified alkyd are obtained with a solvent content of approximately 35 to 50%.

(3) The temperature at which the polymerization is performed is preferably as high as convenient so as to form short chain length polymers which are more compatible and soluble than the longer chain length polymers in the alkyd resin solution. When xylol is used as a solvent 140° C. is the reflux temperature. Some higher boiling solvent may be used to raise this temperature but as styrene boils at 145° C. at atmospheric pressure, 140° C. is satisfactory and tends to keep the styrene in the batch.

(4) The amount of styrene may be varied as desired but substantially less than 20% styrene does not impart the desirable properties to the resin and substantially more than 60% styrene tends to make the product too thermoplastic, too brittle, and detracts from the solvent resistance of the film. Within the range of 20% to 60% styrene most of the desirable qualities are found in styrene modified alkyds.

(5) The catalyst may be of many types. Those having the best high temperature stability and high boiling range are the most suitable. Organic peroxides such as benzoyl peroxide, ditertiary butyl peroxide, cumene hydro-peroxide or combinations of these may be used.

(6) A satisfactory peroxide content is 2 to 5% peroxide based on the styrene present. This should be adjusted for different peroxides as they vary in percentage of active oxygen present.

(7) The peroxide should be added over a considerable period of time as the activity diminishes as the peroxide decomposes during the heating period.

(8) The polymerization is continued for five to ten hours depending on the effectiveness of the catalyst and the percentage conversion of styrene from the monomer to the polymer desired.

The following illustrative examples describe certain alkyds which have been prepared and the physical properties of the resins solutions which were obtained upon copolymerization with styrene. All resin solutions are filtered to remove the lead phosphate which is present in each case where litharge is used as a catalyst for the alcoholysis reaction. All viscosity measurements were made using Gardner-Holdt varnish standards and all colors were determined with the Hellige-Klett color comparator which ranges from 1L to 9. Non-volatile determinations were obtained by evaporating the solvent from a weighed amount of resin in a flat dish in an oven at 105° C. for two hours.

*Example I*

The following ingredients were loaded into a reaction vessel equipped with an agitator, inert gas inlet and vapor outlet, and a heating device, in this case an electric mantel:

| | Parts |
|---|---|
| Soya bean oil | 100 |

The ingredients were heated with agitation and with inert gas slowly passing over batch to 180° C.

| | |
|---|---|
| Added litharge | 0.1 |

Heated to 230° C.

| | |
|---|---|
| Added glycerine | 30 |

Held at 230° until 1 part of batch was soluble in 4 parts of ethyl alcohol.

| | |
|---|---|
| Added phosphoric acid | 0.06 |
| Added glycerine | 27 |
| Added phthalic anhydride | 100 |
| Added maleic anhydride | 4 |

These additions caused the temperature to drop so the batch was reheated to hold the temperature between 200° and 210° C. Inert gas was then passed through the batch instead of over the top of the kettle.

After continuing the heating for about eight hours at 200° to 210° C. the solid resin had an acid number of 25.45 (i. e. mg. KOH/gm. Batch). The batch was then split three ways by weighing portions in three separate flasks A, B and C.

Flask A was loaded with 605 g. solid resin and 618 g. of xylol was added. The batch in flask A was heated to 140° C. with agitation and protected with inert gas, and 150 grams of styrene monomer were then added. A reflux condenser was attached to the vapor outlet. This mixture was held at 140° C. for one-half hour then 1.5 grams of ditertiary butyl peroxide in 45 grams of xylol was added over a half hour period. The batch was held for one-half hour at a reflux temperature of 144° C. and then 1.5 g. more of ditertiary butyl peroxide in 45 g. of xylene were added over a half hour period. After refluxing a half hour longer the last portion of 1.5 g. of ditertiary butyl peroxide was added in 45 g. of xylol. The batch was then held for three hours at about 144° C.

The final physical characteristics of the clear light styrene and oil modified alkyd resin were

| | |
|---|---|
| Nonvolatile content | 48.55% |
| Viscosity (Gardner-Holdt) | Y |
| Color (Hellige-Klett) | 2 |
| Acid number | 7.87 |
| Calculated per cent styrene conversion | 85.35 |
| Calculated per cent styrene added | 19.8 |

A clear film was produced on baking or air drying the filtered product.

Flask B was then loaded with 506 g. of base alkyd resin and 595 g. of xylol were added. The batch was heated to 140° C. with agitation and protected with inert gas and 220 grams of styrene monomer were then added. This mixture was held at reflux (145° C.) for one-half hour then in the same manner as described for flask A.

Three separate additions of 2.2 grams of ditertiary butyl peroxide in 46 grams of xylene were made, the catalyst in the solution being added slowly over a half hour period and a half hour interval allowed after completion of the first addition and starting the second. The same interval was allowed between the end of the second addition and start of the third.

The solution was held at reflux temperature for three hours after the last addition and the following characteristics determined for the resulting styrene and oil modified alkyd.

| | |
|---|---|
| Nonvolatile content | 48.25% |
| Viscosity (Gardner-Holdt) | Z |
| Color (Hellige-Klett) | 2 |
| Acid number | 6.59 |
| Calculated per cent styrene conversion | 88.37 |
| Calculated per cent styrene added | 30.1 |

A clear film was produced on baking or air drying the filtered resin solution.

Flask C was then loaded with 500 gm. of alkyd solids and 473 gms. of xylene were added. Then in the same manner as in flasks A and B styrene to the amount of 88 grams was added and ditertiary butyl peroxide in three additions of .88 gram in 36 grams of xylol. The batch was held for three hours at about 145° after the last catalyst addition was complete and a clear resin solution resulted having the following properties:

| | |
|---|---|
| Nonvolatile content | 47.69% |
| Viscosity (Gardner-Holdt) | $X^2$-Y |
| Color (Hellige-Klett) | 2 |
| Acid number | 8.01 |
| Calculated per cent styrene conversion | 69.08 |
| Calculated per cent styrene added | 14.94 |

A clear film resulted after either air drying or baking the resin in solution which was filtered.

*Example II*

In the same manner as in Example I soya oil was reacted with litharge and glycerine to form a mixture of mono, di, and triglycerides. The proportions were:

| | Parts |
|---|---|
| Soya bean oil | 150 |
| Litharge | 0.15 |
| Glycerine | 30 |

After one part of the mixture was clear in four parts of ethanol the following materials were added:

| | Parts |
|---|---|
| Phosphoric acid | 0.08 |
| Glycerine | 23 |
| Phthalic anhydride | 100 |
| Maleic anhydride | 5 |

This batch was held at 200° to 210° C. for eight hours and the solid resin was found to have an acid number of 19.9. A 50% nonvolatile solution of the resin in xylene had a viscosity between B and C on the Gardner-Holdt scale.

A 501 gram portion of the solid resin was loaded into a reaction vessel and 818 grams of xylene added. After heating to 145° C. with agitation and inert gas protection and with a reflux condenser at the vapor outlet, 500 g. of styrene monomer were added. Then in these three step additions of catalyst as in Example I, 5 grams of ditertiary butyl peroxide in 61 grams of xylene were added three times over a two and one-half hour period so that a total of 15 grams of ditertiary butyl peroxide in 183 grams of xylene were added. This batch was held three hours at 140° after the last catalyst addition was completed. The characteristics of the finished resin solution were:

| | |
|---|---|
| Nonvolatile content | 49.3% |
| Viscosity (Gardner-Holdt) | N-O |
| Acid number | 4.8 |
| Color (Hellige-Klett) | 2L-2 |
| Per cent styrene added | 50 |
| Per cent styrene converted | 97.2 |

The clear film resulted from either baking or air drying the filtered resin solution.

*Example III*

In the same manner as in Examples I and II an oil modified alkyd was prepared. In this example, however, the following proportions of ingredients were used:

| | Parts |
|---|---|
| Soya bean oil | 200 |
| Sodium methylate | 0.2 |
| Glycerine | 40 |

When one part of this mixture was soluble in four parts of ethanol as a result of formation of a mixture of mono, di, and triglycerides the following ingredients were added:

| | Parts |
|---|---|
| Glycerine | 16 |
| Phthalic anhydride | 100 |
| Maleic anhydride | 10 |

This batch was cooked fourteen hours at 200 to 210° C. and had an acid number on the solid resin of 23.2. A 528 gram portion of this batch was loaded into a flask with a reflux condenser attached, an agitator and an inert gas inlet to protect the batch from air. 500 grams of xylene were added and 525 grams of styrene monomer were added after the resin and xylene had reached 140° C.

In the same manner as the previous examples the catalyst solution was added in three portions slowly over half hour periods and one-half hour allowed between the end of each addition before the start of the next addition. In this example, however, the first two portions of catalyst solution consisted of 6 grams of benzoyl peroxide dissolved in 100 grams of xylene and the third addition was 4 grams of ditertiary butyl peroxide in 100 grams of xylene. After one hour at 145° after the last addition of catalyst 234 grams of xylene were added.

The characteristics of the batch were:

| | |
|---|---|
| Nonvolatile content | 48.23% |
| Viscosity (Gardner-Holdt) | $X$-$Y^3$ |
| Color (Hellige-Klett) | 2L |
| Acid number | 5.8 |
| Per cent styrene conversion | 90.4 |
| Per cent styrene added | 49.2 |

A film of the material was clear on air drying or baking.

*Example IV*

In the same manner as in Examples I, II and III a soya bean oil modified glyceryl phthalate resin was prepared. The proportions of ingredients were:

| | Parts |
|---|---|
| Soya bean oil | 600 |
| Sodium methylate | 0.6 |
| Glycerine | 70 |

This mixture was heated to 230° C. with agitation and protected by a slow current of inert gas to prevent darkening of the oil until one part of the mixture was soluble in three parts of anhydrous ethyl alcohol. The batch was then allowed to cool to 200° C. and 100 parts of phthalic anhydride followed by 30 parts of maleic anhydride were added. This resin was heated for eleven hours at 200° to 210° C. The acid number was 19.04. The batch was divided into two portions. One portion of 578 grams of solid resin was reacted with an equal amount of styrene monomer to which 500 grams of xylene had been added. 18 grams of benzoyl peroxide was divided into three 6 gram portions and each portion dissolved in 100 grams of xylene. Each separate portion of catalyst was added over a half hour period and one-half hour allowed for reaction before the next addition was started. The batch was held at 150° C. for five hours. The second part of the alkyd was treated in exactly the same way only mineral spirits were added instead of xylene to the batch. The catalyst additions were dissolved in three 100 gram portions of xylene however.

The resin solution prepared with all xylene had the following characteristics:

| | |
|---|---|
| Nonvolatile | 56.75% |
| Viscosity (Gardner-Holdt) | M |
| Color (Hellige-Klett) | 1–2L |
| Acid number | 6.43 |
| Per cent styrene added | 50.0 |
| Per cent styrene converted | 89.68 |

The film was clear on both air drying and baking.

The resin solution that was prepared in the presence of 500 grams of mineral spirits, however, had a very cloudy appearance. It had the following characteristics:

| | |
|---|---|
| Nonvolatile | 57.09% |
| Viscosity (Gardner-Holdt) | V-W |
| Color (Hellige-Klett) | Cloudy |
| Acid number | 5.91 |
| Per cent styrene added | 50.0 |
| Per cent styrene converted | 92.36 |

The film prepared by casting or flowing the filtered resin solution on glass and evaporating the solvent was clear. This indicated that the cloudiness in the solution was caused by incompatibility of the resin with mineral spirits as upon removal of the solvent no cloudiness remained in the film.

Example V

The base alkyd in this example was prepared with exactly the same proportions and in an identical manner as in Example I with one exception. This was the substitution of three parts of itaconic acid for four parts of maleic anhydride.

The resin was cooked at a temperature of 200–210° C. for nine hours and had an acid number of 20.96 and a Gardner-Holdt viscosity when reduced to 50% N. V. in xylene of G.

The solid resin was divided into two portions. Portion A weighed 652 grams. To it was added 665 grams of xylene and 163 grams of styrene monomer. The mixture was heated to reflux in the same manner and in the same equipment as previously described. Three portions of catalyst each consisting of 1.66 grams of ditertiary butyl peroxide mixed with 49 grams of xylene were added in three one-half hour periods at one-half hour intervals. When the catalyst was all added the temperature was maintained for three more hours at 141° C.

The finished resin solution of the A portion had the following characteristics:

| | |
|---|---|
| Nonvolatile | 47.49% |
| Viscosity (Gardner-Holdt) | M |
| Color (Hellige-Klett) | 2L |
| Acid number | 6.33 |
| Per cent styrene added | 19.95 |
| Per cent styrene converted | 77.84 |

The film of this resin was clear and dried very rapidly to a tack free condition.

Portion B of solid resin was 552 grams. To this solid resin were added 745 grams of xylene and 360 grams of styrene monomer.

In the same manner as in portion A, three separate catalyst additions were made which consisted of 3.6 grams of ditertiary butyl peroxide dissolved in 55 grams of xylene. This solution was held at 144° C. for three hours and had the following characteristics:

| | |
|---|---|
| Nonvoltatile | 49.51% |
| Viscosity (Gardner-Holdt) | T²-U |
| Color (Hellige-Klett) | 2L |
| Acid number | 4.63 |
| Per cent styrene added | 39.09 |
| Per cent styrene converted | 95.98 |

The resin was clear on either air drying or baking a flowed, sprayed, or cast film of the filtered solution on glass.

Example VI

In this resin the copolymerization of styrene monomer is accomplished by means of the double bonds present in maleic anhydride as there are only single double bonds of very low reactivity present in the castor oil.

600 parts of raw castor oil were heated to 180° C. and 0.6 parts of sodium methylate were added, the temperature was raised to 230° C. and 50 parts of glycerine were added. This mixture was maintained at 230° for one hour and 12 parts more glycerine added. 100 parts of phthalic anhydride were added and at 180° 18 parts of maleic anhydride were added. The temperature was raised to between 200 and 210° C. and held there for eight hours. At the end of this time the acid number was 11.9 on the solid resin. 405 grams of this solid base alkyd were added to 650 grams of xylene and raised to 140° C. 400 grams of styrene monomer were added and after one-half hour an addition of 3.3 grams of ditertiary butyl peroxide in 53 gram of xylene was made over a one-half hour period. One-half hour later another identical catalyst addition was made and one-half hour after completion of the second addition a third identical addition was made. The batch was refluxed at 145° C. for two and one-half hours after completion of the last catalyst addition and achieved the following characteristics:

| | |
|---|---|
| Per cent nonvolatile | 49.1 |
| Viscosity (G.-H.) | T–U |
| Color | 1 |
| Acid number | 2.5 |
| Per cent styrene added | 50 |
| Per cent conversion | 98.2 |

The film was very clear on evaporation of solvent.

A second portion of 737 grams of base alkyd resin was dissolved in 800 grams of xylene and heated to 140° C. On reaching 140° C. 250 grams of styrene monomer were added. After one-half hour three catalyst additions of 2.8 grams of ditertiary butyl peroxide were made in identically the same manner as the first of these two copolymerization products. The batch was for a period of three hours at 145° C. after the last catalyst addition was completed. The final resin solution had the following characteristics:

| | |
|---|---|
| Per cent nonvolatile | 48.9 |
| Viscosity (G.-H.) | G |
| Color (H.-K.) | 2 |
| Acid number | 4.1 |
| Per cent styrene added | 25.3 |
| Per cent conversion | 94.5 |

The film was clear but softer than the first product.

Example VII

This example is a copolymerization product of a soya oil and rosin modified glyceryl phthalate alkyd with styrene monomer.

Heat a mixture of 90 parts of soya oil and 10 parts of rosin to 240° and add 40 parts of glycerine. Hold 240° C. until one part of batch is clearly soluble in four parts of alcohol. At this time add 10 parts of glycerine and 100 parts of phthalic anhydride. Allow batch to cool to 145° C. and add 3 parts of maleic anhydride and 3.6 parts of ethylene glycol. Take one and one-half hours to return to 200° to 210° and hold for five and one-half hours whereon an alkyd is obtained having an acid number of 30.6 of nonvolatile resin.

981 grams of this solid base alkyd were dissolved in 700 grams of xylene and 340 grams of styrene monomer were added at 140°. One-half hour after styrene monomer was added catalyst additions were made. They consisted of three additions of 6 grams of benzoyl peroxide dissolved in 133 grams of xylene one-half hour apart and taking one-half hour to make the addition. The batch was refluxed at 145° C. for five hours after the last of the catalyst had been added and then 203 grams of xylene were added.

The resin solution had the following characteristics:

| | |
|---|---|
| Per cent nonvolatile | 49.25 |
| Viscosity | P |
| Color | 4L |
| Acid number | 9.33 |
| Per cent styrene added | 25.74 |
| Per cent styrene converted | 94.2 |

The film formed on evaporation was clear.

Example VIII

*Clear coating on paper.*—Material as prepared in Examples I, II, III, IV, V, and VI was reduced to 30 to 40% nonvolatile with a mixture of ½ Union #40 or dipentine and ½ V. M. P. A small amount of cobalt naphthenate was added as a drying catalyst, preferably .05% cobalt metal based on the resin nonvolatile weight. This solution was applied to the printed side of a label or magazine cover or some such printed paper to render glossy and water and smear resistant. The solution resin was applied by a roller coating device or by hand and the paper was heated by conducting it through an oven or a bank of infrared lamps for a short time to drive off the solvent. It then has a glossy, tack free, wear, water and smear resistant coating lending sharpness and brilliance to the colored printing or lithographing.

We claim:

1. A coating composition comprising an interpolymer formed by heating in the presence of a catalyst (1) a modified alkyd resin in an inert aromatic solvent and (2) styrene, the alkyd resin being derived from the reaction of polyhydric alcohol selected from a group consisting of glycerine and a mixture of glycerine and glycol with a carboxylic compound a major portion of which is an aromatic carboxylic compound selected from a group consisting of phthalic anhydride and phthalic acid, and a minor proportion of which consists of at least one unsaturated compound selected from a group consisting of maleic, fumaric, itaconic, sorbic acids and their anhydrides, the alkyd resin being modified with at least one member of a group consisting of non-drying and semi-drying oils and their fatty acids, the styrene content of the interpolymer being approximately within the range of 20 to 60% of the interpolymer, the percentage of oil or oil acid in the alkyd being about 30 to 80% calculated as oil and consisting essentially of said non-drying or semi-drying oils or their fatty acids and the percentage of inert solvent employed during interpolymerization being approximately within the range of 35 to 50%.

2. A process for the manufacture of a styrene modified resin suitable for use as a coating composition, which comprises heating in the presence of a catalyst (1) styrene, and (2) a modified alkyd resin in an inert aromatic solvent, the alkyd resin being derived from the reaction of polyhydric alcohol selected from a group consisting of glycerine and a mixture of glycerine and glycol with a carboxylic compound a major proportion of which is an aromatic carboxylic compound selected from a group consisting of phthalic anhydride and phthalic acid, and a minor proportion of which consists of at least one unsaturated compound selected from a group consisting of maleic, fumaric, itaconic, sorbic acids and their anhydrides, the alkyd resin being modified with at least one member of a group consisting of non-drying and semi-drying oils and their fatty acids, the styrene content of the interpolymer being approximately within the range of 20 to 60% of the interpolymer, the percentage of oil or oil acid in the alkyd being about 30 to 80% calculated as oil and consisting essentially of said non-drying or semi-drying oils or their fatty acids and the percentage of inert solvent employed during interpolymerization being approximately within the range of 35 to 50%.

3. A process as set forth in claim 2, wherein a peroxide catalyst is employed to aid the interpolymerization.

4. A process as set forth in claim 2, wherein the styrene and modified alkyd resin solution are heated together under reflux conditions.

CHARLES J. MEESKE.
DENO LAGANIS.

References Cited in the file of this patent

UNITED STATES PATENTS

| Number | Name | Date |
|---|---|---|
| 1,847,783 | Pieper | Mar. 1, 1932 |
| 2,194,894 | Ellis | Mar. 26, 1940 |
| 2,305,224 | Patterson | Dec. 15, 1942 |
| 2,392,710 | Wakeford et al. | Jan. 8, 1946 |
| 2,407,479 | D'Alelio | Sept. 10, 1946 |

OTHER REFERENCES

Hewitt et al., Trans. J. Oil and Colour Chemists Ass'n, June 1946, pages 109, 110, 116 and 117.

Wicks, Interchemical Review, Autumn 1947, pages 63 and 72.